United States Patent [19]

Wicks

[11] Patent Number: 4,813,242

[45] Date of Patent: Mar. 21, 1989

[54] EFFICIENT HEATER AND AIR CONDITIONER

[76] Inventor: Frank E. Wicks, 1 Nicholas Ave., Schenectady, N.Y. 12309

[21] Appl. No.: 121,878

[22] Filed: Nov. 17, 1987

[51] Int. Cl.[4] .............................................. F25B 27/00
[52] U.S. Cl. ...................................... 62/238.3; 62/476
[58] Field of Search ................. 62/238.3, 238.6, 323.1, 62/323.2, 332, 333, 335, 476

[56] References Cited

U.S. PATENT DOCUMENTS

| | | | |
|---|---|---|---|
| 2,667,766 | 2/1954 | Cummings | 62/238.3 X |
| 4,270,365 | 6/1981 | Sampietro | 62/238.3 |
| 4,380,909 | 4/1983 | Sung | 62/238.3 X |
| 4,439,999 | 4/1984 | Mori et al. | 62/238.3 |
| 4,510,762 | 4/1985 | Richarts | 62/238.6 X |
| 4,646,541 | 3/1987 | Reid, Jr. et al. | 62/238.3 X |
| 4,719,767 | 1/1988 | Reid, Jr. et al. | 62/476 |

*Primary Examiner*—Lloyd L. King

[57] ABSTRACT

The purpose of this invention is to cost effectively achieve more fuel efficient cooling and heating of buildings and also provide society with the resource conservation and environmental benefits that can result from the more efficient use of our fuel resources. The invention uses conventional equipment and includes an internal combustion engine and components that are now used in electric driven compression and steam driven absorption air conditioning and heat pump systems. The work from the engine provides a direct mechanical drive for the compression cycle and most of the rejected heat from the engine is recovered and utilized by the absorption cycle, which is achieved by recovering the high and medium temperature heat in the absorption cycle generator and recovering the low temperature heat from the engine exhaust by the mixture flow stream from the absorber to the generator. The result is a direct fueled engine driven combined cycle system that can be twice as fuel efficient as existing electric driven compression or steam driven absorption systems, and that can cost effectively replace most exissting systems in large building and provide substantial resource and environmental benefits.

1 Claim, 1 Drawing Sheet

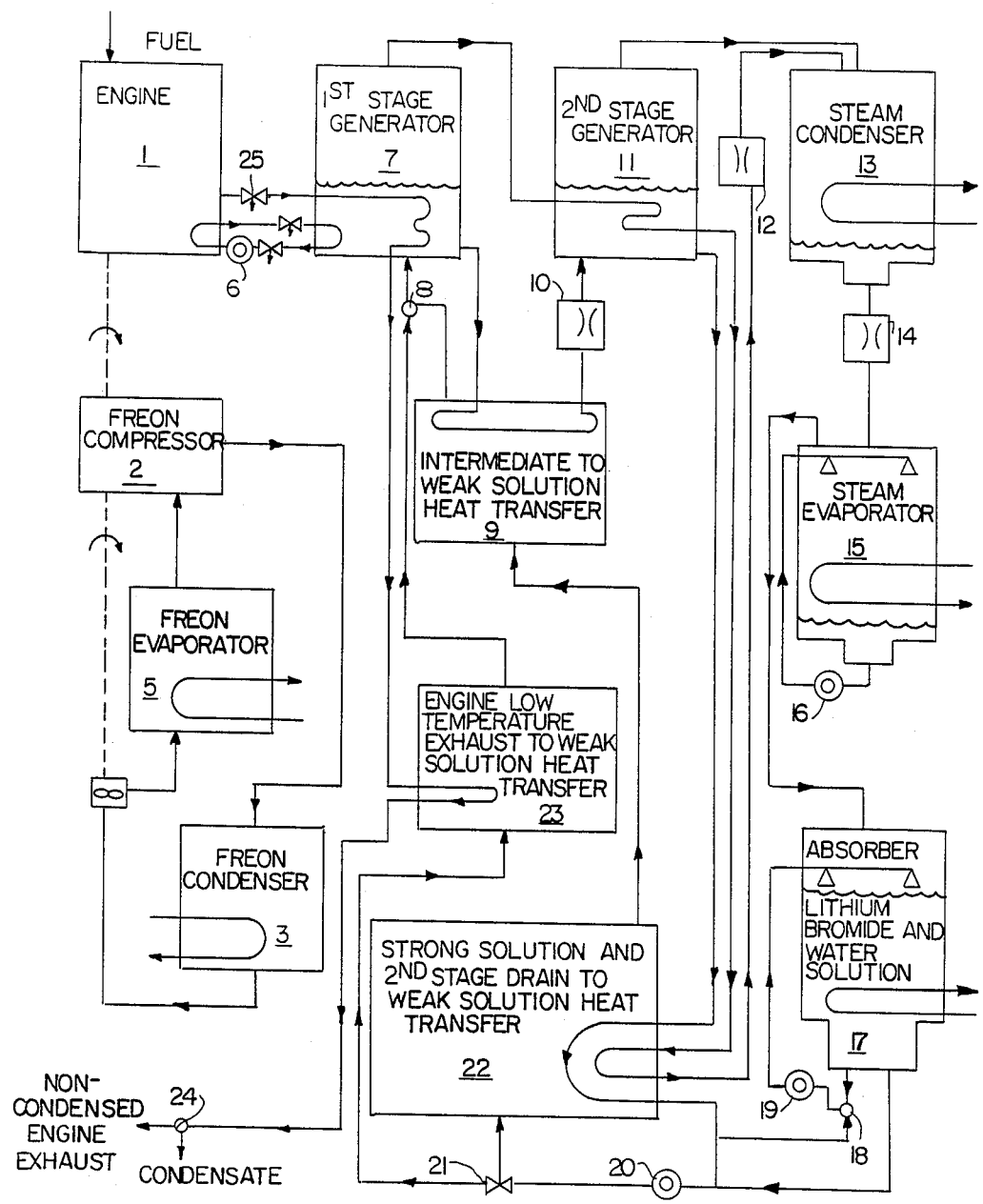

EFFICIENT HEATER AND AIR CONDITIONER

This invention, which is named the Wicks Efficient Heater and Air Conditioner (WEHAC), and is shown in the FIGURE consists of an internal combustion engine with its mechanical output driving the compressor of a compression air conditioner or heat pump cycle and with most of the engine reject heat recovered by an absorption air conditioning or heat pump cycle, which is a achieved by recovering the high and medium temperature heat in the generator and the low temperature heat from the engine exhaust by the flow stream of the mixture from the absorber to the generator of the absorption cycle. The useful heat removal in the air conditioner mode is the heat for vaporization in the evaporators and the useful heat added in the heat pump mode is the heat of condensation in the condensers and the cooling heat in the absorber. This system makes the best possible use of the high temperature heat of fuel combustion by producing work to drive a compressor and also obtains near complete utilization of low temperature heat, and as a result can be twice as fuel efficient as existing air conditioning systems. The use of existing component component equipment and technology should also result in a system of comparable installed costs relative to existing systems. Thus, this system can be a cost effective and highly fuel conserving alternative to most existing systems in large and moderate size buildings.

The types of existing systems that this invention will primarily improve upon are moderate to large size electric driven air conditioners and heat pumps and also absorption systems that are now either direct fueled at the system generator or driven by external heat from boilers or hot water heaters.

WEHAC in the cooling mode can provide more than 50% fuel saving benefit relative to existing electric or absorption air conditioners, and in the heating mode, WEHAC can provide more than 50% fuel saving benefit relative to existing electric heat pumps or heating boilers. The installed cost of WEHAC should be comparable to the installed cost of existing space conditioning equipment for most commercial size buildings and also for large residential complexes. It is also appropriate to consider the cost of the electric generation and transmission that is required for electric air conditioning. With the electric generation and transmission considered, WEHAC can provide an installed equipment cost benefit in excess of 50% relative to electric air conditioning.

WEHAC can be fueled by oil or propane, but natural gas should be the preferred fuel for many installations. It is the inventor's belief that very large resources of natural gas exist and that for many years this gas will continue to be produced and delivered at moderately high prices. He further submits that there is much to be gained by using this gas more efficiently than is used in existing equipment and practice.

Accordingly, and within the context of a cost minimizing and coordinated electric, gas, fuel conservation and environmental protection policy, WEHAC can provide the multiple benefits of substantially decreasing need for expensive new electric generation and transmission capacity, along with providing substantial fuel conservation and environmental benefits that will result from the displacement of more polluting fuels. These enviromental benefits should include cleaner air and water and less acid rain. WEHAC will also provide a new use for the gas surpluses that occur during the summer and are expensive to store, and thus much of the existing summer surplus is now used very inefficiently or wasted, and better use of gas during the summer should also lower the costs of delivering gas during the winter.

Furthermore, and within this multiple benefit context, the inventor of the subject system has also invented and been issued a Patent for an electricity producing ultra high efficiency furnace (U.S. Pat. No. 4,680,478), which combines the fuel conserving technique of electric cogeneration with the fuel saving technique of a condensing furnace. The subject system has been partly inspired by the importance and identified potential for a system that can provide comparable and matching benefits in larger buildings and during the summer.

Thus the inventor's ultimate objective is large scale utilization of both the subject invention and the electricity producing furnace as a means for providing our society with the multiple benefits of lower energy costs, fuel conservation, cleaner air and water and less acid rain, along with a lower production of carbon dioxide from other fuels, which can help reduce the greenhouse effect that may be causing dangerous warming of our earth.

BACKGROUND AND PRINCIPLES

This invention combines a compression cycle and absorption cycle. Compression cycles are work driven, and thus utilize only the high temperature portion of the heat of fuel combustion. Absorption cycles are heat driven and utilize the low temperature portion of the heat of combustion. This provides the potential of combining a compression cycle and an absorption cycle with the result that only half as much fuel is needed to transfer a given amount of heat from a lower to a higher temperature, which is the process that is required in both the air conditioning and space air heating modes. It is also noted that the reject low temperature heat from the process of burning fuel in an engine to produce work can be utilized by the absorption cycle only if the engine and the absorption cycle are at the same location. It is noted that the common practice for a compression cycle is electric motor drive, but the compression cycle can be driven directly by the engine with the same result, along with advantages such as elimination of the losses in the generator and in the motor and also with the way capability to vary speed, which increases the effective efficiency over a wide range of heat loads and temperatures differences.

Thus, the best practical system is an engine driven compression system with the highest practical engine efficiency and compression system coefficient of performance, and the recovery of the highest practical amount of the engine reject heat and the input of this heat into an absorption system with the highest practical coefficient or performance. The inventor believes that the subject invention, as shown in the FIGURE, represents the best that can be acheived by combining existing technology and practice, and with realistic improvement and modification of existing equipment. This belief is the result of an extension examination of existing practice and equipment, along with the consideration and analysis of many alternative configurations.

ENGINE, COMPRESSION CYCLE AND ABSORPTION CYCLE DESCRIPTION AND EXPECTED PERFORMANCE

The reference system is a liquid cooled piston engine driving a compression cycle and with the engine reject heat recovered by the first stage of a two stage absorption cycle. Variations on the reference system that the inventor describes and claims are a combustion turbine engine, which requires no coolant, for large sizes, and the use of a single stage absorption system for smaller sizes and lower coolant temperature engines. The primary sources for the following description, data and analysis for this invention are the American Society of Heating, Refrigeration and Air Conditioning Engineers (ASHRAE) 1985 Fundamental Handbook, Thermal Environmental Engineering by James L. Threlkeld, 1970 and a translation from German to English by Perry Blackshear in 1965 of Technical Thermodynamics by Fran Bosnjakovic, 1937. Additional information on existing systems and practice has been obtained from manufacturer personnel and product literature.

The reference engine will have a 30% efficiency and operate with an elevated coolant temperature in the range of 340° F., which is about 150° F. higher than typical liquid cooled engines, but is a temperature that should be practically attainable by a combination of design, and lubricants. Successful operation of engines at 280° F. coolant temperature has been demonstrated, and the additional temperature should be achievable. The higher coolant temperature also results in a larger portion of the engine exhaust heat available at temperatures above the operating temperature of the first stage, which enhances the useful heat recovery capability.

The compression cycle is a conventional four processes of compression, condensing, pressure reducing and evaporation with Freon as the working fluid. The most common method for pressure reduction is a passive throttling process, but the cycle efficiency can be somewhat improved by performing the pressure reduction with a work producing reducer, which has the double advantage of providing some additional power to the compressor and resulting in a higher portion of condensed freon to the evaporator. Practically attainable Coefficient of Performance (COP) in the air conditioning mode is 2.5 and in the heating mode a COP of 3.5 is reasonably attainable when the outside temperature is substantially above freezing and the COP will typically deteriorate to 1.5 with outside temperature substantially below freezing.

The two stage absorption air conditioner uses Lithium Bromide for the absorbent and water as the refrigerant. The water is absorbed in the Lithium Bromide and water solution in the absorber and is pumped through a strong to weak solution heat exchanger and then through a medium to weak solution heat exchanger and to the first stage generator, where external heat boils a portion of the water out of the weak solution. This steam then becomes the heat source to boil additional water out of the intermediate solution in the 2nd stage generator, which also results in the condensing of the steam from the first stage. In the existing two stage absorption systems this condensate is then sent directly to the condenser where it mixes with the steam from the second stage. This invention utilizes the fact that the condensate from the second stage has about 100 F of recoverable heat and thus it uses this condensate to heat the weak solution in a parallel path with heat transfer from the strong solution to the weak solution. This should increase the COP of the two stage absorption cycle by about 5% to a value of 110%. This compares with COP values of 105% that are presented in the ASHRAE Handbook, in the textbooks and by manufacturers for configurations that don't use this technique for the useful recovery of heat from the condensate from the 2nd stage generator.

The corresponding COP is 210% for this absorption system operating in the heating mode. However, the system is limited in the heating mode to outside temperatures above freezing, since water is the refrigerant.

Thus, the subject invention will have three operating modes. When it is in the air conditioning mode, the useful heat is the heat that is absorbed in the evaporators of both the compression and the absorption cycle. When it is in the heating mode and the outside temperature above freeing, the useful heat is the heat rejected by the condenser of each cycle plus the heat that is rejected by the absorber. When it is in the heating mode with the outside temperature below freezing, the compression cycle will continue to operate, but the absorption cycle will be shut down, and all the engine reject heat that normally goes to the absorption cycle should provide direct heating of the space air.

RESULTING EFFECTIVE FUEL EFFICIENCY IN EACH OPERATING MODE

The effective fuel efficiency is defined as the ratio of useful heat removed or delivered to the heat of combustion of the input fuel. The effective fuel efficiency of WEHAC will be a function of the previously defined engine efficiency, the COP of both the compression and the absorption cycle and the operating mode.

WEHAC is also designed to provide near complete useful heat recovery from the engine coolant and exhaust gas. The exhaust gas can be cooled to about 100° F., which allows most of the sensible heat and a substantial portion of the latent heat of the water vapor in the exhaust to be usefully recovered, and with the result that only about 5% of the heat value of the fuel that is input to the engine will be non-usefully rejected to the environment by the combined streams of exhaust condensate and noncondensed exhaust gasses.

The resulting energy balance on the engine is the conversion of 30% of the input of mechanical work, 65% of the input recovered for useful purposes and 5% wasted in each of the three defined operating modes.

AIR CONDITIONING EFFICIENCY (MODE 1)

The effective fuel efficiency in the a ir conditioning mode is the engine efficiency (30%) times the compression cycle air conditioning COP (2.5) plus the amount of engine input heat usefully recovered (65%) by the absorption cycle times the absorption cycle air conditioning COP (1.1). This results in an overall effective fuel efficiency of 146.5% in the air conditioning mode.

HEATING EFFICIENCY WITH OUTSIDE TEMPERATURE ABOVE FREEZING (MODE 2)

The effective fuel efficiency is the engine efficiency (30%) times compression cycle COP (3.5) plus the amount of engine input heat that is usefully recovered (65%) times the COP of the absorption cycle for heating (2.1) for overall effective fuel efficiency of 241.5% in this moderate outside temperature heating mode.

HEATING EFFICIENCY WITH THE OUTSIDE TEMPERATURE BELOW FREEZING (MODE 3)

In this mode, the engine driven compression cycle will continue to operate, but the engine reject heat will be recovered by the space air by means of passive heat exchanged for both the engine coolant and the engine exhaust. The resulting effective fuel efficiency will be the engine efficiency (30%) times the compression cycle COP (1.5), plus the amount of input fuel heat value that is usefully recovered from the engine (65%) for an overall effective efficiency of 110%.

It is noted that the absorption cycle has to be shut down when the outside air temperature is below freezing, only if outside air is the heat source of the evaporator. However, it is possible to have an evaporator heat source above 32° F., even though the outside air temperature is below 32° F. These possibilities include solar heating of the heat source water for the evaporator, or alternatively, the use of river, lake, or ground water which has a temperature above 32° F., although the outside air temperature is below 32° F. If any of these techniques is practical, the overall fuel efficiency can be substantially higher than 110%, even though the outside air temperature is lower than freezing.

EFFECTIVE EFFICIENCY WITH ONE STAGE ABSORPTION CYCLE

The same engine driven compression cycle can be used with reject heat going to a single stage absorption cycle rather than a two stage absorption cycle. The cycle will be lower efficiency and have less capacity for a given size engine and compression cycle, but it can have a substantial advantage relative to exisiting systems and may be the preferred system for smaller capacity requirements and the engine can also operate, with full coolant heat recovery, at lower temperatures than are required for full engine coolant heat recovery with the two stages absorption cycle. The single stage system recovers the external heat input in a generator with operating pressures and temperatures comparable to the second stage conditions of a two stage absorption cycle.

The single stage absorption cycle will have a COP of about 0.65 as compared to a COP of about 1.1 for the improved two stage absorption cycle. The single stage cycle will also convert 30% of the engine fuel input heat to mechanical work and 65% will be usefully recovered by the absorption cycle with the resulting engine exhaust leaving at about 100° F., which recovers most of the sensible heat and much of the latent heat of the water vapor in the combustion products.

The corresponding effective fuel efficiency for the system using a single stage absorption cycle is defined and calculated in the same manner as for the two stage absorption cycle, and can be defined for the same three operating modes of cooling, heating with the outside temperature above freezing, and with the outside temperature below freezing which requires the shutdown of the absorption system but the engine reject heat can still be usefully recovered by passive heat exchangers in the heated space air circuit.

The resulting effective fuel efficiency for the single stage absorption cycle for these three operating modes is 117.25%, 212.25% and 110% respectfully, which compares with the previously calculated effective efficiencies of 146.5%, 241.5%, and 110% for the same three operating modes for the system using a two stage absorption cycle.

COMPARISON WITH EXISTING PRACTICE ELECTRIC AIR CONDITIONER AND HEAT PUMP

The fundamental fuel efficiency advantage of WEHAC, relative to electric heat pumps, is the fact that virtually none of the typical 65% reject heat is recovered at the electric power plant, along with the additional losses in the transmission system and in the electric drive motor for the compressor. The fact that the speed of an electric drive motor can not be readily varied to respond to the most efficient speed for the range of operating conditions in terms of temperature differences and heat loads is another efficiency disadvantage of electric relative to WEHAC for which the engine speed can be easily varied to best respond to the conditions and requirements. This lack of speed control will typically result in a seasonal coefficient of performance of about 10% lower for a constant speed electric drive relative to a variable speed direct engine drive.

The previously specified practically attainable values of compression cycle COP for the three modes were 3.5, 2.5 and 1.5, and a 10% seasonal COP penalty results in COP values of 2.25, 3.15 and 1.35 for a constant speed electric motor drive. The resulting effective fuel efficiency for these three modes and with an electricity production and delivery efficiency of 30% becomes 67.5%, 94.5% and 40.5%, which compares with the previously calculated values of 146.5%, 241.5% and 110% for the subject invention with the two stage absorption cycle and the previously calculated values of 117.25%, 212.25% and 110% for the subject invention using a single stage absorption cycle.

The corresponding fuel conservation benefit of the subject WEHAC relative to electric and in each mode for the two stage absorption cycle is 53.9%, 60.9% and 63.2% and for the single stage absorption cycle, the fuel conservation benefit, relative to electric, is 42.5%, 55.5% and 63.2%.

WEHAC SYSTEM CONFIGURATION, COMPONENTS AND TERMINOLOGY

The reference system and configuration, along with the 27 identified components, is shown in the Figure. The following describes each of the components.

Component (1) is the engine, which can be a conventional gasoline engine modified for natural gas or a diesel engine fueled by oil. These engines should be designed and operated at high coolant temperatures for maximum useful heat recovery, and this high coolant temperature should also result in more high temperature recoverable heat in the exhaust, and also a higher engine efficiency. Alternatively, and in the sizes above about 1000 hp, combustion turbines, which have all reject heat in the exhaust stream, may be a cost and fuel efficient option.

Component (2) is the engine driven compressor, which compresses the freon for a conventional compression cycle.

Component (3) is the compression cycle freon condenser. In the air conditioning mode it is cooled by outside cooling water and/or air, while in the heating mode it is cooled by an inside loop of space heating water or space air.

Component (4) is a freon expander, which both reduces the freon pressure and produces a nominal amount of mechanical power that is input to the compressor. Alternatively, this component can be a passive throttling device for reducing the pressure, which is simpler and cheaper, but results in a less efficient cycle. While the latter is the more common practice, the higher efficiency expander technique has been developed and successfully demonstrated. Thus, either device can be considered existing technology.

Component (5) is the evaporator for the compression cycle. In the air conditioning mode, it cools the loop of chilled water or brine for space cooling, or alternatively, the evaporator can directly cool the space air. In the heating mode, the evaporator operates with heat from the outside, and transfers this heat to the inside of the building via the condenser. It is noted that the heat load on the condenser is the sum of the heat load on the evaporator and the work input to the compressor in both the air conditioning and heating modes.

Component (6) is the engine coolant pump and can be either internal to the engine block or external. It is also noted that the coolant will operate at about 300° F. and the choices of coolant can be pressurized water, various engine antifreeze solutions that also have higher boiling points and anti-corrosion advantages or organic or oil based compounds. An alternative to a single liquid state system is a system in which the coolant boils in the engine block and condenses in the cooling heat exchanger, which is the first stage generator. Another possibility is to use the weak solution of lithium bromide and water directly as the engine coolant, which would have the advantage of about 20° F. more temperature to the solution for a given engine coolant temperature, since the additional heat exchanger and corresponding temperature difference would be eliminated.

Component (7) is the first stage generator, in which heat is delivered from the high portion temperature exhaust and from the engine coolant, and this heat drives the water from the solution in the form of medium pressure steam. The solution temperature is typically about 330° F. and the steam is produced at about 240° F. and the corresponding saturation pressure of 27 psia. The solution is in the shell and the engine exhaust and coolant pass through tubes in a downward path, which provides counterflow to the rising refrigerant. Maximum heat transfer from the engine to the solution at the lowest possible temperature is the objective. This will be achieved by a stratified type of design in which in the upper level the engine exhaust enters at bout 1100° F. and cools to about 400° F., and in the lower level in which the engine exhaust can further cool to about 325° F., and in which the engine coolant will circulate at inlet temperature of abut 340° F. and outlet temperature of about 325° F. The inlet solution flow will be the weak solution at about 55% lithium bromide and 45% water by weight and the outflow of intermediate solution will be about 58.6% lithium bromide and 41.4% water by weight, and this intermediate solution is the inflow to the second stage generator.

It is noted again that water is the refrigerant and lithium bromide is the absorbent, and it is also noted that there is much inconsistency in the absorption refrigeration field with respect to absorbent and refrigerant solution terminology for its states of concentration around the cycle. ASHRAE Technical Committee 5.6 has agreed to standardize on the term weak solution as the solution from the absorber and is thus weak in its affinity to pick up more refrigerant, while strong solution is the return flow to the absorber, and is strong in affinity to pick up refrigerant. Accordingly, solution from the first stage to the second stage can be defined as intermediate solution. Thus, the weak solution has the highest water content and the strong solution has the lowest water concentration for the lithium bromide and water absorption cycle. The lowest practical water content is about 35% for the strong solution. The basis for this limit is to prevent crystallization at the return temperature to the absorber.

Component (8) is the mixing junction for two parallel paths of weak solution flow from the absorber, and the outflow is the weak solution to the first stage generator.

Component (9) is the heat exchanger that transfers heat from the intermediate solution flow from the first stage to second stage generator to the strong solution flow. This is a standard heat exchanger for two stage absorption cycles and serves the purpose of increasing efficiency by recovering some heat to the first stage and it also minimizes the amount of flashing in the second stage generator by lowering the temperature of the inlet solution.

Component (10) is the throttling type pressure reducer that reduces the pressure of the intermediate solution from the shell pressure of the first stage generator to the shell pressure of the second stage generator. It is further noted that the shell pressures correspond to the saturation pressure of the steam that is produced in each shell, and thus the first stage shell pressure will be about 27 psia and the second stage shell pressure will be about 1 psia, which corresponds to a steam temperature of about 100° F.

Component (11) is the second stage generator for which the heat source is the steam from the first stage generator and the second stage generator also serves as the condenser for this steam from the first stage. The inflow is the intermediate solution of concentration corresponding to the outflow from the first stage generator. The outflow from the second stage generator is the strong solution that returns to the absorber via a heat exchanger that transfers heat from the strong solution to a weak solution flow stream from the absorber.

Component (12) is a throttling type pressure reducer for the water drain from the coils of the second stage generator that has subsequently flowed through a heat exchanger to transfer available heat to a weak solution flow stream from the absorber. Thus, the inlet pressure to this pressure reducer is the first stage shell pressure of about 27 psia and the outlet pressure is the condenser pressure which will be about 0.7 psia, which is saturation pressure at 90° F.

Component (13) is the condenser for the steam that is produced in the second stage generator, and the condenser also collects the condensate that has been condensed from the steam form the first stage generator in the heating tubes of the second stage generator. Thus, the refrigerant out flow from the condenser will be slightly subcooled water and the amount will be the sum of the steam production in the first stage generator and the second generator. The cooling for the condenser is typically water that is available at a temperature marginally above the building space temperature, or at about 80° F. This would correspond to a condenser shell pressure and temperature of about 0.7 psia and 90° F., and an outlet condensed water temperature that is slightly subcooled below the 90° F. saturation temperature.

Component (14) is the throttling type of pressure reducer for the condensed water from the condenser at 0.7 psia and to the evaporator, which will have a typical shell pressure of about 0.12 psia.

Component (15) is the evaporator, where the cooling is the result of boiling the inlet water at a typical saturation pressure an temperature of 0.12 psia and 40° F. The heat source for the evaporation is typically the chilled water for space cooling that enters the evaporator tubes at 55° F. and leaves at 45° F. when the system is operating in the cooling mode, and the heat source for the evaporator is typically a water supply that is external to the building, and thus draws heat from the outside, when the system is operating in the heating mode.

Component (16) is a recirculating pump for the evaporator, which is not necessary, but it improves the heat transfer within the evaporator shell by drawing condensate from the bottom and spraying it on the tubes from above. It is noted that this recirculation technique is a standard design option for large systems, and it can also be used for the freon evaporator, component (5), although it is not specifically indicated in FIG. 1.

Component (17) is the absorber in which the steam flow from the evaporator mixes with the strong solution flow that is returning from the second stage generator via a heat exchanger. and the outlet flow from the absorber is the resulting weak solution that flows to the first stage generator via heat exchangers. The absorber shell is cooled to a temperature comparable to the condenser temperature by the same cooling source that is used by the condenser. The lowest attainable temperature in the absorber allows the largest concentration of water to be absorbed in the mixture which results in the most efficient cycle. It is also noted that in the space heating mode, the reject heat from the absorber can be usefully recovered, along with the reject heat from condenser.

Component (18) is the flow junction where the returning strong solution mixes with solution from the absorber and flows to the absorber recirculation pump.

Component (19) is the absorber recirculation pump, which discharges to spray nozzles at the top of the absorber to improve the mixing action between the incoming steam from the evaporator and the solution.

Component (20) is the solution pump, which takes suction from the absorber and discharges to the fist stage generator via the heat recovery heat exchangers. It is also noted that for the two stage system the shell pressure of the first stage generator corresponds to the pressure of the steam that is produced, which is about 27 psia. The pressure in the shell of the absorber is slightly lower than the evaporator pressure of about 0.12 psia. Thus, the pressure increase required for the solution pump is about 27 psia plus the pressure drop through the piping and heat exchanger flow path.

Component (21) is a three way regulating valve with the inflow from the solution pump and with the two outflow stream of weak solution taking parallel paths through heat recovery heat exchangers enroute to remixing and flow to the shell of the first stage generator. The basis for controlling the amount of outflow in each of the parallel streams from this three way valve will nominally be the flow split that results in the same temperature increase through the heat recovery heat exchangers in each path.

Component (22) is a heat recovery heat exchanger in which heat is transferred to the weak solution from the flow stream of strong solution returning to the absorber, and from the condensate from the second stage heating coils enroute to the shell of the condenser. It is noted that the transfer of heat from the returning strong solution to the weak solution that is flowing from the absorber is standard practice in all absorbtion systems, and much efficiency and fuel would be wasted if this technique was not practiced. However, it is not standard practice to also recovery heat from the condensate from the second stage heating coils for two stage absorption systems, and, furthermore, it is not obvious that this can be done, since it may appear that all the heat that can be utilized by the weak solution stream can be recovered from the returning strong solution. However, further examination and data shows that there is both less flow in the strong solution stream, by the amount that is boiled as refrigerant, and that the heat capacity of the weak solution is substantially higher than the heat capacity of the strong solution. The higher heat capacity of the weak solution can be explained by the higher portion of water in the mixture and the fact that water has a higher heat capacity than lithium bromide.

Component (23) is a heat recovery heat exchanger in which low temperature engine exhaust heat is recovered by one of the two parallel flow steams of the weak solution enroute from the absorber to the generator. It is noted that this heat exchanger is unique to the WEHAC invention, and this heat exchanger can be utilized with both the two stage and singe stage absorber cycles. The temperature of the incoming engine exhaust will be nominally higher than the concentration temperature in the lower level of the generator, which will be about 300° F. for a two stage cycle, and about 220° F. for a single stag cycle. The outlet temperature of the exhaust will be about 100° F., at which temperature most of the sensible heat and much of the latent heat has been recovered from the engine exhaust, and thus the outlet will contain condensate as well as concondensed exhaust gasses. It is also noted that the exhaust gasses in this low temperature range and with the condensate can be moderately to highly corrosive, depending upon the fuel. Thus, the exhaust side should be of material which will not damage, such as teflon or stainless steel. It is also noted that the engine exhaust should flow in the downward direction through this heat exchanger in order for the condensate to drain downward and out with the flow of the noncondensed exhaust gas. The reason that this low temperature can be utilized, in addition to the low temperature heat that is recovered from the strong solution return, is again the result of the fact that the weak solution stream can use more heat than is available from the strong solution because of the additional flow rate by the amount of refrigerant that is boiled off and the fact that the heat capacity of the weak solution larger than the heat capacity of the strong solution. It is also noted that this additional source of heat for the weak solution means that the strong solution can return to the absorber at a somewhat higher concentration, which means that more steam can be produced from the solution in the generators with a corresponding increase in cycle COP.

Component (24) is the junction on the engine exhaust stream to environment at which the condensate from the exhaust flow gas can be drained.

Component (25), (26) and (27) are three way valves or flow diversion devices, that direct the engine exhaust flow and the engine coolant flow to the absorption cycle for useful heat recovery except when the system is operating in the heating mode with low outside temperatures and the absorption system can not operate and must be shutdown. When the absorption system is shutdown, component (25) redirects the engine exhaust to a heat exchanger in the space air stream in which all heat can be recovered down to an engine exhaust temperature of about 100° F. and components (26) and (27) direct the engine coolant to a total heat recovery heat exchanger in the space air stream.

SYSTEM PACKAGING, MAINTENANCE, OPERATION AND CONTROL

The engine driven compression cycle equipment should probably be factory fabricated, shipped, and installed on a skid and the absorption system equipment on another skid. Furthermore, the absorption cycle components of second stage generator, evaporator, and absorber all operate at the very low pressures of about 1 psia or less, and thus, it is standard practice to design these components as separate compartments within a single horizontal tank. This design has the advantages of both lower cost and decreasing the number of joints and connections at which air can leak into the system.

The engine will probably be the primary maintenance requirement, and the engine may also be replaced several times over the life of the system. Thus, a design with multiple engines or spare engines should be considered. WEHAC should have enough cost saving advantage, relative to electric systems, to justify redundant engines.

The connections between the compression and absorption cycles are the engine exhaust and engine coolant loop, shown in the Figure, and also a common supply of inside chilled water for the evaporators, and a common supply of outside cooling water for the condenses and the absorber in the air conditioning mode, and these water supplies are reversed for the system in the heating mode with the absorption cycle operating. In the heating mode without the absorption cycle operating, the internal cooling loop for the compression cycle condenser also recovers useful heat with passive heat exchangers on the engine coolant and on the engine exhaust.

The amount of heat transfer by WEHAC will be normally proportional to the fuel flow to the engine, and thus the rate of fuel flow will be the primary command and this flow rate will be actuated either by a flow control valve for natural gas or some combinatin of control valve position and fuel pump operation for liquid fuels. The control variable and set point will be the temperature of the water loop that is transferring heat in the building, or alternatively, the building space air temperature can be used if no temperature zoning is required.

A control within the system will be the position of the three way control valve that modulates the portion of the total weak solution flow in each of the two parallel paths through heat exchangers from the absorber to the generator. The previously submitted control basis is for an equal temperature rise in each of the parallel paths, but this basis may be modified or limited on the basis of constraints such as the allowable concentraion versus temperature of the strong solution at the return to the absorber. It was also previously noted that the additional source of low temperature heat from the engine exhaust with WEHAC should result in a higher return temperature of the strong solution, since less heat is removed during the downflow process by the upflowing weak solution, and this higher return temperature can allow additionals team production in the generator.

ENERGY, FLOW AND CONCENTRATION BALANCE AND TEMPERATURES EXAMPLE

Fundamental to a viable system is the satisfaction of the scientific and engineering laws and principles of conservation of energy and conservation of mass and the ability of heat to flow only from higher to lower temperatures in passive heat exchangers. The ability to perform these calculations for WEHAC also requires data for the properties of stem and water as a function of temperature and pressure and the properties of mixtures of lithium bromide and water solutions as a function of solution temperature and concentration.

The following analysis demonstrates a set of allowable operating conditions for the the subject invention for the configuration that is shown in the Figure. The properties of steam and water and the properties of lithium bromide and water solutions are obtained from compiled data tables in the ASHRAE 1985° F.undamentals Handbook. It is also noted that this analysis requires an iterative set of calculations that converge upon the required balances with acceptable temperatures and concentrations.

The resulting system has a strong concentration of 0.657 and a weak solution concentration of 0.557 where concentration is defined as the weight of the lithium bromide divided by the total weight of the lithium bromide plus water in the solution.

Applying these concentrations to a flow balance calculation shows that the production of 1 lb of steam refrigerant results from the flow of 6.57 lb of weak solution from the absorber and the return flow of 5.57 lb of strong solution to the absorber. It is noted that these concentrations are comparable to existing practice and examples in the ASHRAE Handbook and textbooks.

It was previously stated that the ability to utilize the low temperature engine exhaust heat depends upon the fact that there is less available heat in the returning strong solution than can be utilized by the upflowing weak solution. It is also noted that the available heat in a stream between two temperatures is the product of the flow rate and the heat capacity. Now that the concentrations of the weak and the strong solution have been identified, the corresponding heat capacities can be obtained from the ASHRAE Handbook and the resulting heat capacity of the weak solution is 0.489 Btu/lb F and of the strong solution is 0.426 Btu/lb F, and the product of these flow rates and heat capacities results in only 73.86% as much heat that can be utilized by the weak solution can be obtained from the strong solution between two temperatures. This confirms that the low temperature heat from the engine exhaust can be utilized, and also that the heat in the condensate drain from the second stage generator in the temperature range between the generator temperature and the condenser temperature can also be utilized for heating the weak solution enroute from the absorber to the generator.

The following step by step analysis can now be performed starting with a fuel flow to the engine of 1,000,000 Btu/hr. The 30% efficient engine driving a compression cycle with a COP of 2.5 results in a heat removal of 750,000 Btu/hr by the compression cycle evaporator. It is also noted that the 300,000 Btu/hr of mechanical work by the engine is equivalent to 87.9 Kw or 117.9 hp.

The mount of engine reject heat that will be recovered by the absorption cycle is 650,000 Btu/hr and 50,000 Btu/hr is rejected to the environment. The COP of the improved two stage absorption cycle is 1.1, which means 715,000 Btu/hr heat removal by the evaporator of the absorption cycle, for a total of 1,465,000 Btu/hr, or 122 tons, of air conditioning, at an effective fuel efficiency of 146.5%. The electric power requirement for the same 122 tons of air conditioning using electric air conditioning with a COP of 2.25 would be 190.2 Kw.

The evaporator load, of 715,000 Btu/hr, also provides a good starting point for completing the energy, flow and concentration balance and temperature analysis for the absorption cycle. Assuming that the evaporator operates at 40° F., the latent heat of saturated steam is found from the data tables to be 1060 Btu/lb. However, the condensate that enters the evaporator from the condenser will be at about 92° F., which means that about 52 Btu/lb is added to the evaporator chilled water circuit to decrease this water to the 40° F. saturation temperature in the evaporator. Thus, the net amount of heat that is required to boil a pound of the incoming condensate in the evaporator will be 1008 Btu/lb, and the corresponding rate at which the refrigerant flows through the evaporator is the heat load divided by the heat per lb which is 709.66 lb/hr of the steam refrigerant.

The corresponding flow balance on the absorber is an inflow of 709.66 lb/hr of steam and 3952.8 lb/hr of strong solution and an outflow of weak solution of 4662.5 lb/hr. The enthalpy of the incoming steam is 1078.68 Btu/lb and the enthalpy of the weak and strong solutions depend upon concentration and temperature. An absorber temperature of 86° F. is typical and the corresponding enthalpy of the outflowing weak solution at this temperature is found in the ASHRAE Handbook Data to be 33.04 Btu/lb for the concentration of 0.557. The temperature and corresponding enthalpy of the incoming strong solution will be found to be 104° F., which corresponds to an enthalpy of 64.65 Btu/lb at the concentration of 0.657. The heat load on the absorber is the difference between the flow rate times the enthalpy in the incoming and outgoing streams and the value of this heat load is 866,996 Btu/lb. This absorber cooling requirement will be removed by the same source of cooling water from the outside as is used for cooling the freon and steam condensers.

The next step is to calculate the heat that can be recovered by the weal solution from the returning strong solution and from the condensate drain in the heat recovering heat exchange, which is Component (22) in the Figure. The temperature of the strong solution from the second stage generator and to this heat exchanger is 200° F. and the leaving temperature is 104° F. and the heat capacity of this strong solution is 0.426 Btu/lb F, and the flow rate is 9252.8 lb/hr for a resulting heat transfer from this stream of 161,654 Btu/hr. The total refrigerant production rate is 709.66 lb/hr and 36% of this is produced in the first stage generator, which corresponds to 255.48 lb/hr, and thus this is the rate of condensate drain from the tubes of the second stage generator. The leaving temperature of the drains is from the second stage generator is 210° F., and the leaving temperature from the heat exchanger is 104° F., and the heat capacity is 1 Btu/lb F for this water, and thus the heat recovery from this second stage condensate drain is 27,081 Btu/hr and the total heat recovered by the weak solution is the sum of 161,654 and 27,081 Btu/hr, for a total of 188,735 Btu/hr.

The next step is the calculation of the heat transfer from the intermediate solution that is flowing from the first stage to the second stage generator. This heat is transferred to the weak solution enroute to first stage generator. It was previously noted that 36% of the refrigerent is produced in the first stage generator and that the concentration of the weak solution is 0.557 and the concentration of the strong solution is 0.657, and thus the concentration of this intermediate solution is about 0.613, and the corresponding heat capacity from the data in the ASHRAE Handbook is 0.46632 Btu/lb F and this intermediate solution flow rate is weak solution flow rate to the first stage generator minus 36% of the total steam production rate of 709.66 lb/hr, for a resulting intermendiate solution flow rate of 4407.02 lb/hr. The temperature of this intermediate solution from the first stage generator is 335° F. and the outflow to the second stage generator is at 220° F., for a total heat transfer of 236,334 Btu/hr to the weak solution.

The next step is to calculate the split between the two parallel paths of weak solution flow from the absorber to the first stage generator, where the sum of these streams is the 4662.5 lb/hr that has been previously calculated. The flows should be split so that the temperature rise in each stream is about the same. The total heat input to the stream that goes through the two previously calculated heat exchangers is 188,735 plus 236,334 Btu/hr for a total of 425,069 Btu/hr. The heat available to the other stream is about 100,000 Btu/hr, which is the amount of heat that can be recovered from the engine exhaust between the temperature of 325° F. and 100° F. for a fuel combustion rate of 1,000,000 Btu/hr in the engine. The corresponding flow rates for equal temperature rise should be 3774.5 lb/hr through the 425,069 Btu/hr heat transfer path and 888 lb/hr through the 100,000 Btu/hr path of low temperature heat recovery from the engine exhaust. The temperature of the entering weak solution from the absorber will be 86° F. and the heat capacity of the weak solution is 0.489 Btu/hr F, and the resulting temperature rise of thew weak solution in each path will be 230.3° F. for a entering temperature to the first stage generator of 316.3° F.

The heat load on the condenser will be the condensing of the 64% of the total steam production that is produced in the second stage generator. This team flow rate is 454.18 lb/hr and the latent heat and subcooling to 86° F. is 1091 Btu/lb, for a total condenser heat load of 494,513 Btu/lb.

A check on the energy balance requires the heat input to the absorption cycle to equal the heat output, with the pump work, which is small, neglected. This check shows a good and typical balance. The input from the engine reject is 650,000 Btu/hr and from the evaporator is 715,000 Btu/hr and the output from the absorber is 866,996 But/hr and from the condenser is 494,513 Btu/hr. Normalizing this energy balance to 100 units of input from external heat source results in 110 units of heat to the evaporator and 133.5 units of heat from the absorber and 76.5 heat units from the condenser.

NEW AND NON-OBVIOUS IMPROVEMENTS

The subject invention combines and adds additional features to existing and previously identified technology and practice in a manner that provides substantial benefits. The primary exisiting technology and practice is the electric or engine driven compression cycle and the heat driven absorption cycle as energy driven techniques for transferring heat from a lower to a higher temperature, which is the basic requirement for air conditioning, refrigeration and heat pumps. There are also engine driven and electricity producing cogeneration systems in which the reject heat from the engine drives the absorption cycle, by recovering heat from the exhaust gas in the temperature range above the temperature of the mixture in the generator of the absorption cycle and by recovering the heat in the engine coolant. There are also two stage absorption cycles in which the refrigerant vapor that is produced in the first stage generator is used as a heat source for producing more refrigerant vapor in the second stage generator.

The inventor believes that the new and non-obvious improvements in the subject invention relative to exisiting and previously identified practice is the combination of an engine directly driving a compression cycle and the engine reject heat driving an absorption cycle. The inventor also believes another new and non-obvious improvement is the recovery of the portion of the engine exhaust heat that is below the absorption cycle generator temperature by the method of transferring this low temperature heat to the weak solution in parallel with the commonly practiced method of transferring heat from the strong solution stream to the weak solution stream.

It is noted that this technique of low temperature heat recovery from the engine exhaust can provide benefits with either a single stage or a two stage absorption cycle. It is also noted that the Figure shows a separate heat exchanger for the transfer of low temperature heat from the engine exhaust to the weak solution, but this can be performed within a single heat exchanger, with the weak solution flowing through the shell and with the weak solution and the low temperature exhaust flowing in parallel through separate sets of tubes within the shell. It is also noted that this method of improving efficiency by recovering the low temperature heat from the engine exhaust is not used by existing electricity producing cogeneration systems in which the engine reject heat drives an absorption cycle, but his low temperature heat recovery method from the engine exhaust gas can also be used with this type of electricity producing cogeneration system.

The inventor also notes that his efficiency improving technique for a two stage absorption cycle of recovering heat from the drains of the second stage generator by thew weak solution, and in parallel with the transfer of heat from the strong solution to the weak solution is new and non-obvious and can also be applied to two stage absorption cycles that are not combined with engine driven systems, but that are driven by external supplies of steam or hot water or that are directly fueled at the generator.

The inventor notes again that the ability of the weak solution to utilize the low temperature heat from the engine exhaust and also the heat from the second stage condensate drain is dependent upon whether there is a need for more heat beyond the heat that is available for transfer from the strong solution the weak solution in the temperature range between the temperature of the solution in the generator and the temperature of the solution leaving the absorber. The amount of available heat is the product of the flow rate and the heat capacity and the potential temperature change of the stream. There is always more flow rate in the weak solution stream from the absorber to the generator than in the weak solution stream from the generator to the absorber, by the amount of refrigerant vapor that is produced in the generator, which is typically 10% for single stage absorption cycles and 15% for two stage absorption cycles. The best known solution for an absorption cycle in the temperature range corresponding to air conditioning is the lithium bromide and water solution, and has the favorable feature of a significantly larger heat capacity for the concentration corresponding to the weak solution than for the concentration corresponding to the strong solution. This heat capacity condition is favorable because it provides an additional opportunity to use more heat than is available in the strong solution for heating the weak solution. However, there may be other combinations of absorbents and refrigerants for absorption cycles for which this favorable difference between the weak and strong solution heat capacities does not exist, and thus there would be less use for the engine low temperature exhaust heat.

The inventor notes that some of the thermodynamic principles that are applied to produce a fuel conservation benefit for the subject system, are the principles that are applied to obtain a fuel conservation advantage with cogeneration systems. Specifically, the high temperature heat of combustion is the source of the electricity production and the low temperature engine reject heat drives a low temperature heat intensive process. However, he believes that it is a fact that has not been obvious, that where air conditioning or space heating or large buildings is required, there is almost always a substantial benefit for using the engine output for a direct mechanical drive of a compression cycle, rather than for the production of electricity. The non-electricity producing system, shown in the Figure, has the advantages of avoiding electricity conversion and transmission losses, and decreasing the load on the electric transmission and distribution system, and at a time of peak air conditioning requirement, which is the time when the electric transmission and distribution system will have maximum load an minimum reliablity margins. The method of driving the compressor directly by the mechanical output of the engine also provides an easy and low loss method for speed control, which improves the seasonal coefficient of the system, by responding with the most efficient speed for the various heat load and temperature conditions that exist throughout the air conditioning and heating seasons. The method of the engine directly providing the mechanical drive for the compression system also avoids the problems of independent electricity production in terms of grid inter-connect equipment and buyback rates. These are the uncertainties and problems that typically plague, and must be resolved, for owners and operators of electric cogeneration systems.

The inventor notes that he has initially described the subject invention as a direct fueled air conditioner and heating system that combines an engine drive compression cycle with an absorption cycle, in which virtually all engine reject heat is usefully recovered. He now submits, as alternatives, the invention as shown in FIG. 1 can be described as a non-electric cogeneration system or as a very high efficiency non-electric air conditioner and heat pump.

I claim:

1. A system for transferring heat from a lower to a higher temperature comprising:
   an internal combustion engine:

a compression refrigeration, heat pump or air conditioner cycle with its compressor driven by the mechanical output of the engine;

an absorption refrigeration, heat pump or air conditioner cycle having a single stage and generator or multiple stages and generators and having a weak and strong solution and an absorber and the weak solution is defined as the mixture that flows form the absorber to the first stage generator and the strong solution is defined a the mixture that flows from the last stage generator back to the absorber;

means for recovery of the higher temperature heat from the engine by the first stage generator of the absorption cycle; and a means for recovering the lower temperature portion of the engine exhaust heat by the absorption cycle weak solution in a heat transfer process that is in parallel with the transfer of heat from the strong solution flow stream to the weak solution flow stream.

* * * * *